US012704394B2

(12) United States Patent
Modderman et al.

(10) Patent No.: US 12,704,394 B2
(45) Date of Patent: Aug. 11, 2026

(54) ULTRASONIC FLOW SENSOR

(71) Applicant: Alarm.com Incorporated, Tysons, VA (US)

(72) Inventors: David Modderman, Dunrobin (CA); Ronald Byron Kabler, Roselle, IL (US); Omar G. Dary, Herndon, VA (US); Glenn Tournier, Vienna, VA (US); Dean Constantine, Ft. Lauderdale, FL (US)

(73) Assignee: Alarm.com Incorporated, Tysons, VA (US)

( * ) Notice: Subject to any disclaimer, the term of this patent is extended or adjusted under 35 U.S.C. 154(b) by 574 days.

(21) Appl. No.: 18/103,116

(22) Filed: Jan. 30, 2023

(65) Prior Publication Data

US 2023/0251118 A1 Aug. 10, 2023

Related U.S. Application Data

(60) Provisional application No. 63/307,244, filed on Feb. 7, 2022.

(51) Int. Cl.

| | |
|---|---|
| ***G01F 1/667*** | (2022.01) |
| ***G01F 15/18*** | (2006.01) |
| ***G01F 25/10*** | (2022.01) |

(52) U.S. Cl.

CPC .............. *G01F 1/667* (2013.01); *G01F 15/18* (2013.01); *G01F 25/10* (2022.01)

(58) Field of Classification Search

CPC .......... G01F 1/667; G01F 25/10; G01F 15/18; G01F 1/66; G01F 1/662; G01F 1/668; G01F 15/14

See application file for complete search history.

(56) References Cited

U.S. PATENT DOCUMENTS

| | | | |
|---|---|---|---|
| 4,080,837 | A | 3/1978 | Alexander et al. |
| 4,236,406 | A | 12/1980 | Reed et al. |

(Continued)

FOREIGN PATENT DOCUMENTS

| | | |
|---|---|---|
| CN | 204988388 | 1/2016 |
| EP | 1291620 | 3/2003 |

(Continued)

OTHER PUBLICATIONS

Extended European Search Report in European Appln. No. 23155215.9, dated Jun. 27, 2023, 14 pages.

*Primary Examiner* — Stephen D Meier
*Assistant Examiner* — Quang X Nguyen
(74) *Attorney, Agent, or Firm* — Fish & Richardson P.C.

(57) ABSTRACT

Methods, systems, and apparatus, including computer programs encoded on computer storage media, for an ultrasonic sensor. One of the systems includes a first ultrasonic assembly that includes a first waveguide formed by a first monolithic body, and a first ultrasonic transducer mounted to the first waveguide, wherein the first monolithic body includes a first mounting surface adapted to couple to the first ultrasonic transducer and a first coupling surface adapted to couple to an outer surface of a pipe; and a second ultrasonic assembly that includes a second waveguide formed by a second monolithic body, and a second ultrasonic transducer mounted to the second waveguide, wherein the second monolithic body includes a second mounting surface adapted to couple to the second ultrasonic transducer and a second coupling surface adapted to couple to the outer surface of the pipe.

18 Claims, 10 Drawing Sheets

(56) References Cited

U.S. PATENT DOCUMENTS 4,649,754 A 3/1987 Zacharias
5,415,033 A 5/1995 Maresca et al.
6,624,539 B1 9/2003 Hansen et al.
6,796,189 B1 9/2004 Umekage et al.
7,650,903 B2 1/2010 Yamamoto
7,876,030 B2 1/2011 Taki et al.
7,980,142 B2 7/2011 Nakabayashi et al.
8,181,534 B2 5/2012 Allen
8,186,229 B2 5/2012 Allen
9,063,069 B2 6/2015 Stickel
9,175,994 B2 11/2015 Ueberschlag et al.
11,118,949 B2 9/2021 Mess et al.
11,293,562 B2 4/2022 Mess et al.
2003/0041674 A1* 3/2003 Ohnishi .................... G01F 1/66 73/861.27
2006/0260691 A1 11/2006 Davidoff
2007/0035211 A1 2/2007 Straub et al.
2007/0035212 A1 2/2007 Straub et al.
2010/0011867 A1 1/2010 Klooster et al.
2010/0257942 A1 10/2010 Straub et al.
2010/0313676 A1 12/2010 Straub, Jr.
2011/0146412 A1 6/2011 Hoering et al.
2011/0162460 A1 7/2011 Straub, Jr.
2011/0162461 A1 7/2011 Allen et al.
2011/0162462 A1 7/2011 Allen
2011/0174083 A1 7/2011 Berger et al.
2011/0314932 A1 12/2011 Allen
2013/0167654 A1 7/2013 Ueberschlag et al.
2013/0219707 A1 8/2013 Sui et al.
2013/0220012 A1 8/2013 Knowles et al.
2013/0291650 A1 11/2013 Brown et al.
2014/0083181 A1 3/2014 McDonald et al.
2014/0091675 A1* 4/2014 Nguyen ............... H02N 11/006 310/300
2014/0252254 A1 9/2014 Yuan et al.
2015/0042206 A1 2/2015 Nguyen et al.
2015/0159351 A1 6/2015 Smith et al.
2015/0308870 A1 10/2015 Gottlieb et al.
2016/0093280 A1 3/2016 Ueberschlag et al.
2016/0116317 A1 4/2016 Zhang et al.
2016/0138951 A1 5/2016 Pretre
2016/0161310 A1 6/2016 Leaders et al.
2016/0335875 A1 11/2016 Alcorn et al.
2017/0298597 A1 10/2017 Hammond et al.
2018/0291594 A1 10/2018 Hammond et al.
2019/0154480 A1* 5/2019 Schöb ..................... G01F 15/02
2019/0234528 A1 8/2019 Mess et al.
2019/0234781 A1 8/2019 Mess et al.
2020/0326216 A1* 10/2020 Sarkissian ............ G01N 29/222
2021/0372837 A1* 12/2021 Alcom .................... G01F 1/668

FOREIGN PATENT DOCUMENTS

| | | |
|---|---|---|
| EP | 2682719 | 1/2014 |
| JP | S6061621 | 4/1985 |
| JP | H109916 | 1/1998 |
| JP | 2002131098 | 5/2002 |
| JP | 2017173200 | 9/2017 |
| WO | WO 2015/191775 | 12/2015 |
| WO | WO 2020/210475 | 10/2020 |

* cited by examiner 300B
306
306
306
306
306
306
308
304
304
304
304
304
304
102
302

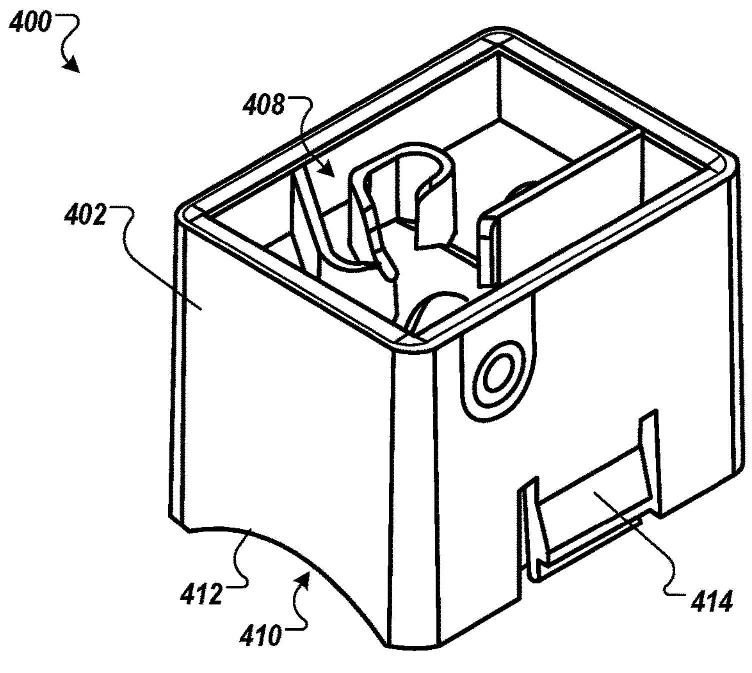
FIG. 4A
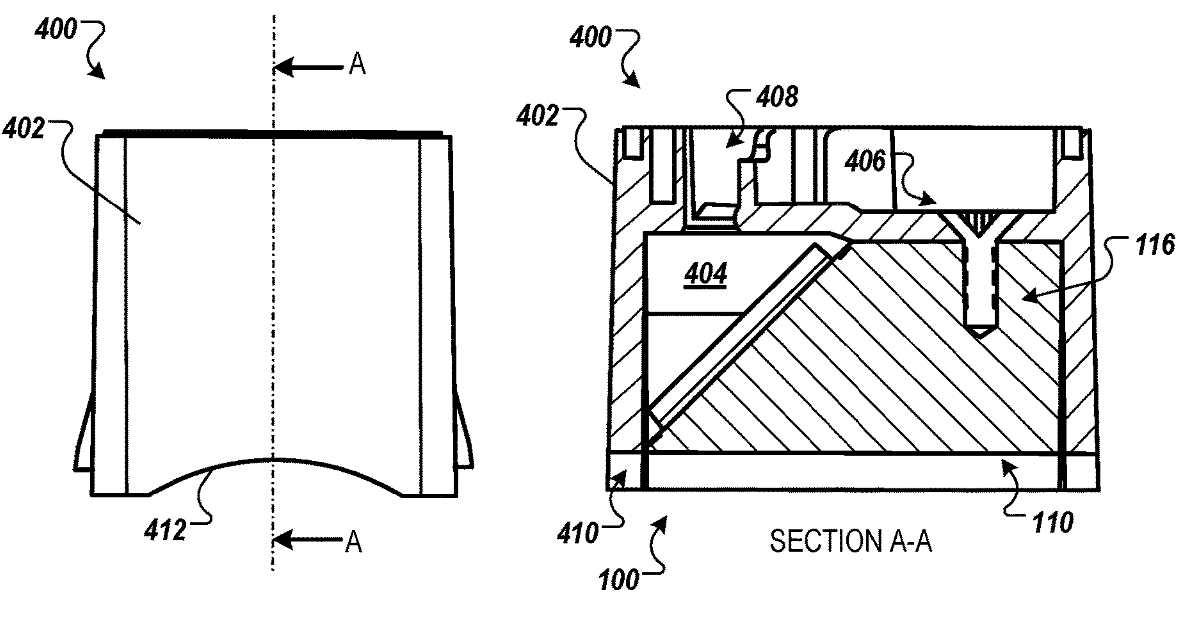
FIG. 4B
FIG. 4C

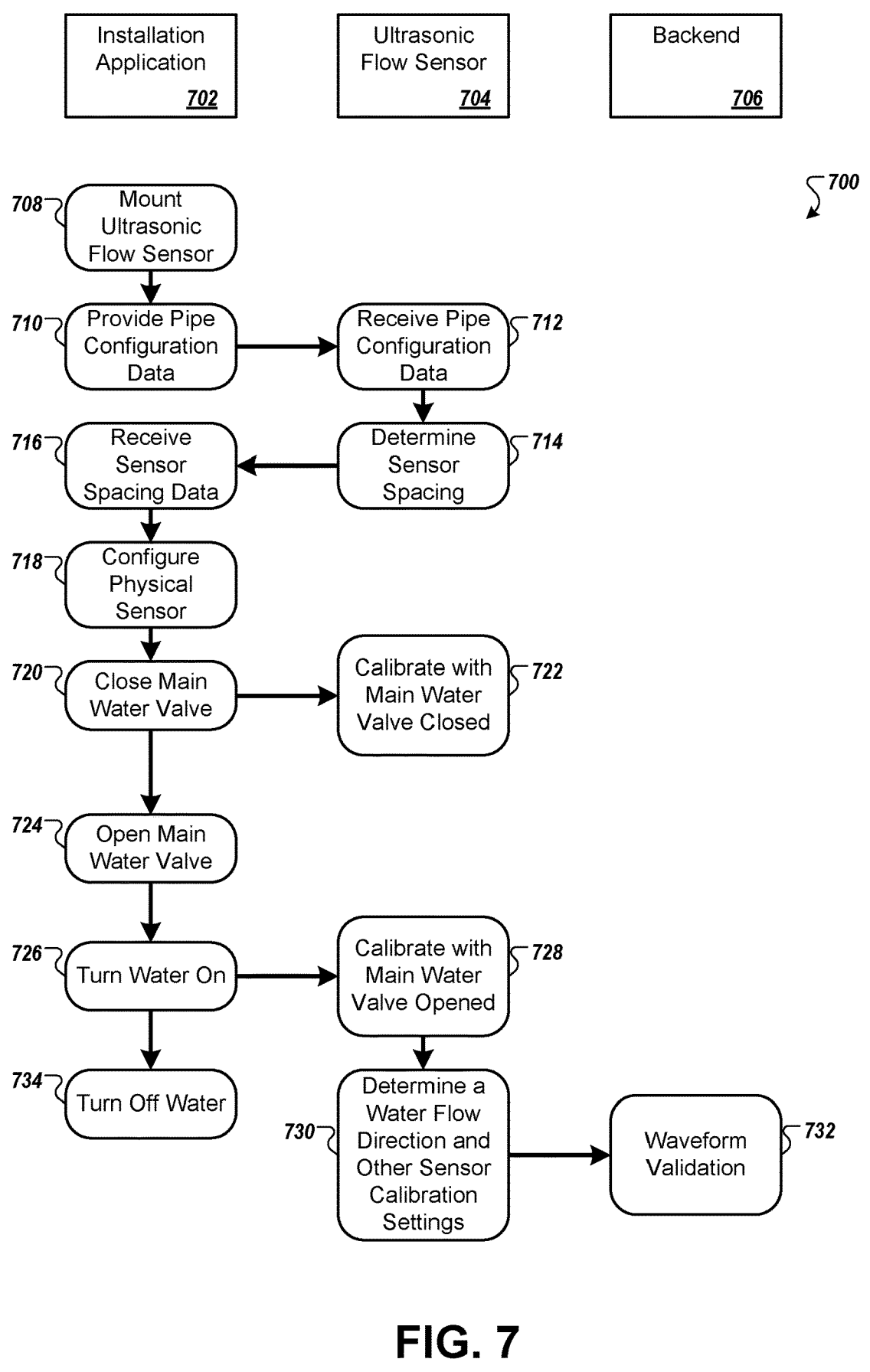

Installation Application 702
Ultrasonic Flow Sensor 704
Backend 706

700

708 Mount Ultrasonic Flow Sensor
710 Provide Pipe Configuration Data
712 Receive Pipe Configuration Data
714 Determine Sensor Spacing
716 Receive Sensor Spacing Data
718 Configure Physical Sensor
720 Close Main Water Valve
722 Calibrate with Main Water Valve Closed
724 Open Main Water Valve
726 Turn Water On
728 Calibrate with Main Water Valve Opened
730 Determine a Water Flow Direction and Other Sensor Calibration Settings
732 Waveform Validation
734 Turn Off Water

FIG. 7

ULTRASONIC FLOW SENSOR

CROSS-REFERENCE TO RELATED APPLICATION

This application claims the benefit of U.S. Provisional Application No. 63/307,244, filed on Feb. 7, 2022, the contents of which are incorporated by reference herein.

BACKGROUND

Pipes are tubes or hollow cylinders that can be used to transport a flowing medium, such as water, in buildings and industrial applications alike. In many situations, it is required to measure the flow rate of the medium through the pipe. A flowmeter can be used to measure flow rate in a pipe. A flowmeter typically includes a mechanical device that is inserted into the pipe. The flowing medium interacts with the flowmeter to produce a measurable change in property (e.g., pressure), and the measured change in property is used to determine the flow rate.

SUMMARY

This disclosure generally describes measuring flow through pipes using ultrasound. Ultrasound can be effective at penetrating various materials for the purposes of sensing. For example, ultrasound can be used to detect the flow of liquid through a pipe from outside the pipe, e.g., non-invasive flow sensing. Such sensors can include a source of ultrasonic energy, e.g., a piezo element, and a waveguide that directs ultrasonic energy between the source and the target material. The described structures can be adapted to mount to the curved outer surface of a pipe and to direct ultrasonic sound waves through the wall of the pipes and into the medium flowing through the pipe, e.g., water. The disclosure further describes a method of manufacturing ultrasonic assemblies and sensors that can be used in ultrasonic flow sensors.

According to some aspects of the present disclosure, an ultrasonic assembly can include a waveguide formed by a monolithic body; and an ultrasonic transducer mounted to the waveguide. The monolithic body includes a mounting surface configured to couple to the transducer and a coupling surface configured to couple to an external structure. In some implementations, the coupling surface can be curved.

According to some aspects of the present disclosure, a method of manufacturing an ultrasonic assembly can include receiving a waveguide; preparing a mounting surface; applying adhesive to the mounting surface; and clamping a piezoelectric disk to the adhesive and mounting surface.

According to some aspects of the present disclosure, an ultrasonic flow sensor can include an outer housing; a clamp configured to clamp the outer housing to an outer surface of a pipe; a first ultrasonic assembly that includes a first waveguide formed by a first monolithic body, and a first ultrasonic transducer mounted to the first waveguide, wherein the first monolithic body includes a first mounting surface configured to couple to the first transducer and a first coupling surface configured to couple to the outer surface of the pipe; and a second ultrasonic assembly that includes a second waveguide formed by a second monolithic body, and a second ultrasonic transducer mounted to the second waveguide, wherein the second monolithic body includes a second mounting surface configured to couple to the second transducer and a second coupling surface configured to couple to the outer surface of the pipe. The first and second ultrasonic assemblies are moveable relative to one another. In some implementations, the first and second coupling surfaces can be curved.

According to some aspects of the present disclosure, a system can include a first ultrasonic assembly that includes a first waveguide formed by a first monolithic body, and a first ultrasonic transducer mounted to the first waveguide, wherein the first monolithic body includes a first mounting surface adapted to couple to the first ultrasonic transducer and a first coupling surface adapted to couple to an outer surface of a pipe; and a second ultrasonic assembly that includes a second waveguide formed by a second monolithic body, and a second ultrasonic transducer mounted to the second waveguide, wherein the second monolithic body includes a second mounting surface adapted to couple to the second ultrasonic transducer and a second coupling surface adapted to couple to the outer surface of the pipe, and the second ultrasonic assembly is a different assembly from the first ultrasonic assembly.

According to some aspects of the present disclosure, a method can include receiving, for a pipe to with which an ultrasonic flow sensor couples, pipe configuration data; determining, using the pipe configuration data, a distance for a space between a first ultrasonic device and a second ultrasonic device both included in the ultrasonic flow sensor; emitting, while the first ultrasonic device is the distance away from the second ultrasonic device and water is not flowing through the pipe and using each of two ultrasonic flow transducers included in the ultrasonic flow sensor, one or more first ultrasonic waves; emitting, while the first ultrasonic device is the distance away from the second ultrasonic device and water is flowing through the pipe and using each of the two ultrasonic flow transducers included in the ultrasonic flow sensor, one or more second ultrasonic waves; and determining, using the one or more first ultrasonic waves and the one or more second ultrasonic waves, one or more sensor calibration settings for the ultrasonic flow sensor that has the distance between the first ultrasonic device and the second ultrasonic device.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination.

In some implementations, the system can include a housing that couples to the first ultrasonic assembly and the second ultrasonic assembly.

In some implementations, the system can include a clamp coupled to the housing and adapted to couple to the housing with the outer surface of the pipe.

In some implementations, the housing might not extend past the first coupling surface of the first ultrasonic assembly.

In some implementations, the first ultrasonic assembly can include a coupling device adapted to couple the first waveguide to the housing. The first waveguide can have an angle between the first mounting surface and the first coupling surface adapted to cause a majority of waveforms transmitted by the first ultrasonic transducer through an area that is not intersected by the coupling device.

In some implementations, the system can include a first coupling device for the first ultrasonic assembly. The system can include a second coupling device for the first ultrasonic assembly. The system can include a slide adapted to enable the first ultrasonic assembly to move between a first location at which the first ultrasonic assembly is coupled to the first coupling device and a second location at which the first ultrasonic assembly is coupled to the second coupling device.

In some implementations, at least one of the first ultrasonic assembly or the second ultrasonic assembly can be adapted to slide along a guide included in the housing.

In some implementations, a distance between the first ultrasonic assembly and the second ultrasonic assembly can be selected using a diameter of the outer surface of the pipe.

In some implementations, a distance between the first ultrasonic assembly and the second ultrasonic assembly can be selected using a material from which the pipe is manufactured.

In some implementations, both the first ultrasonic assembly and the second ultrasonic assembly can be adapted to slide along a guide included in the housing.

In some implementations, the first ultrasonic assembly and the second ultrasonic assembly can be located on the same longitudinal axis.

In some implementations, at least one of the first coupling surface or the second coupling surface, or both, can be curved.

In some implementations, a first diameter of the curve can be the same as a second diameter of the outer surface of the pipe.

In some implementations, the curve can be concave.

In some implementations, at least one of the first coupling surface or the second coupling surface, or both, can directly contact the outer surface of the pipe.

In some implementations, the system can include a controller adapted to drive at least one of the first ultrasonic transducer or the second ultrasonic transducer at a frequency that is different than a resonant frequency of the respective transducer.

In some implementations, the system can include a housing that: couples to the first ultrasonic assembly and the second ultrasonic assembly; and includes an aperture adapted to receive a lead to connect to a first electrode of the first ultrasonic transducer.

In some implementations, the housing can define an internal aperture adjacent to the first ultrasonic transducer and the first mounting surface and contacts at least two side surfaces of the first monolithic body other than the first mounting surface and the first coupling surface.

In some implementations, the first waveguide can include a groove adapted to align the first ultrasonic transducer relative to the first mounting surface.

In some implementations, the method can include detecting whether there is a leak in a second pipe or a device connected to the pipe using the ultrasonic flow sensor configured with the one or more sensor calibration settings.

In some implementations, the pipe and the second pipe are the same pipe, pipe branch, or pipe sub-branch.

In some implementations, the pipe configuration data can include at least one of a pipe type or a pipe diameter.

In some implementations, the first ultrasonic device, the second ultrasonic device, or both, can each include comprise an ultrasonic assembly, a waveguide, or an ultrasonic transducer.

In some implementations, the method can include providing, to a device, data that indicates the distance for the space between the first ultrasonic device and the second ultrasonic device both included in the ultrasonic flow sensor.

In some implementations, the method can include adjusting, using the data that indicates the distance for the space between the first ultrasonic device and the second ultrasonic device both included in the ultrasonic flow sensor, a position of at least one of the first ultrasonic device or the second ultrasonic device.

These and other embodiments described herein may provide one or more of the following advantages. Implementations of the present disclosure may reduce the complexity and processing times for manufacturing an ultrasonic assembly. In some instances, manufacturing errors may be reduced. The described ultrasonic flow sensors may be simple to install, adjustable to different sizes and thicknesses of pipes by changing the spacing of the onboard ultrasonic sensors, or both. For instance, the installation process only requires placement of the ultrasonic flow sensor on the outside of an existing pipe instead of cutting the pipe. The curved coupling surface may improve the contact patch between the ultrasonic assembly and the outer surface of a pipe for better alignment of the ultrasonic assemblies.

In some implementations, an ultrasonic transducer can have improve transmissivity of ultrasonic waves through the waveguide by reducing or eliminating alternate impedance, reflections, refractions, or a combination of these, within the waveguide. In some implementations, the ultrasonic flow sensor described in this specification can require fewer components, e.g., tools, to install compared to other sensors. In some implementations, the ultrasonic flow sensor can automatically detect the direction of water, or other fluid, flow rather than requiring installation in a particular orientation.

The details of one or more implementations of the subject matter described in this specification are set forth in the accompanying drawings and the description below. Other features, aspects, and advantages of the subject matter will become apparent from the description and the drawings.

BRIEF DESCRIPTION OF DRAWINGS

Certain embodiments will now be described, by way of example only, with reference to the accompanying drawings.

FIGS. 4A to 4C show various views of an example ultrasonic sensor according to principles of the present disclosure.

FIG. 7 depicts an example process for configuring an ultrasonic flow sensor.

Like reference numbers and designations in the various drawings indicate like elements.

DETAILED DESCRIPTION

This disclosure generally describes ultrasonic assemblies, sensors, and flow sensors that can be used for non-invasive flow sensing. The described structures can be adapted to mount to the curved outer surface of a pipe and to direct ultrasonic sound waves through the wall of the pipes and into the medium flowing through the pipe, e.g., water.

Figure 1A:
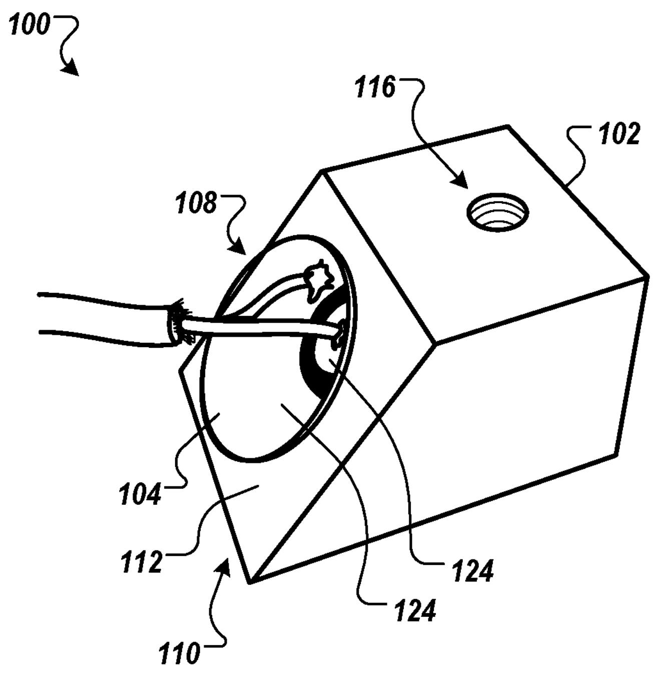
FIGS. 1A to 1D show various views of an example ultrasonic assembly according to principles of the present disclosure.
Figure 1B:
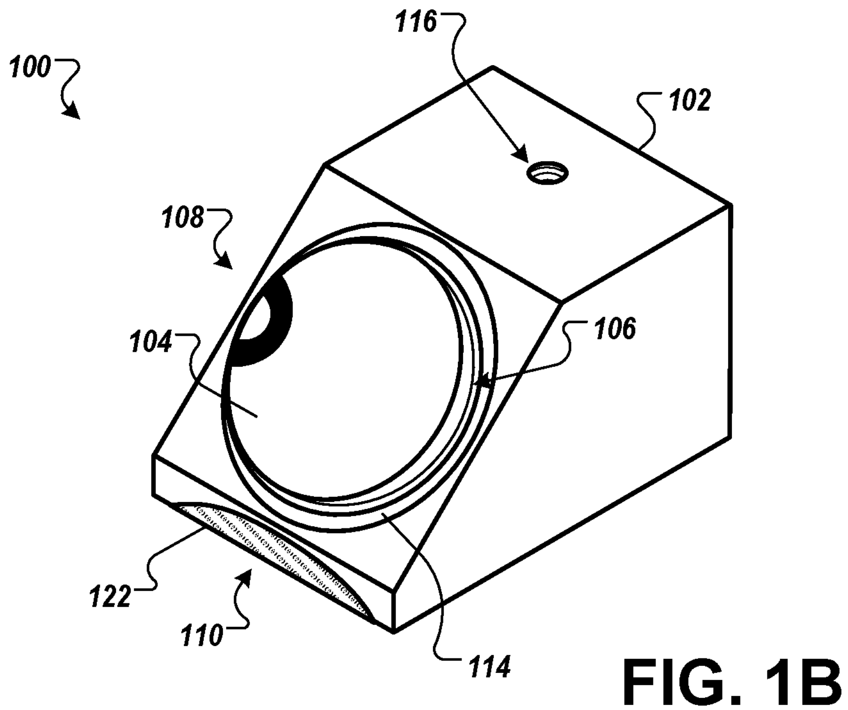
Figure 1C:
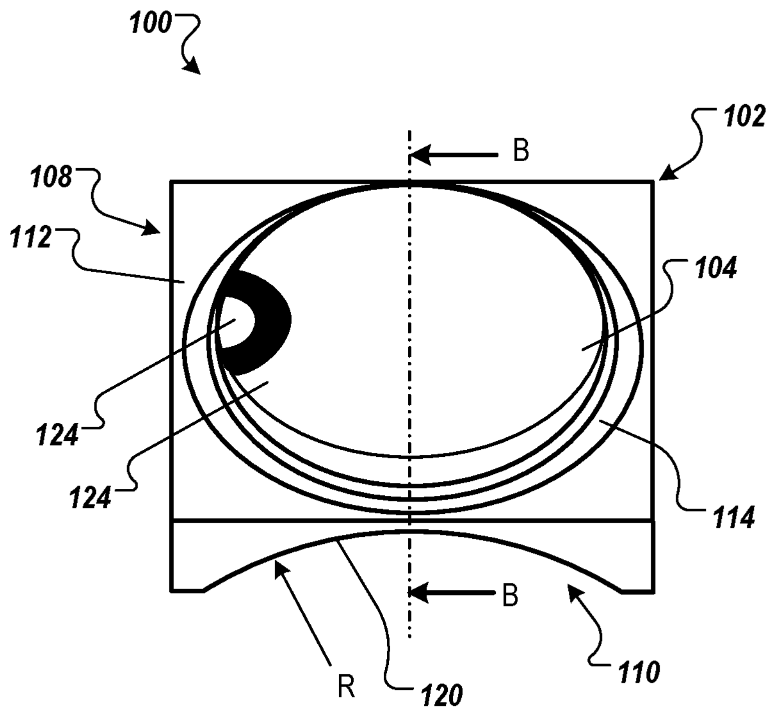
Figure 1D:
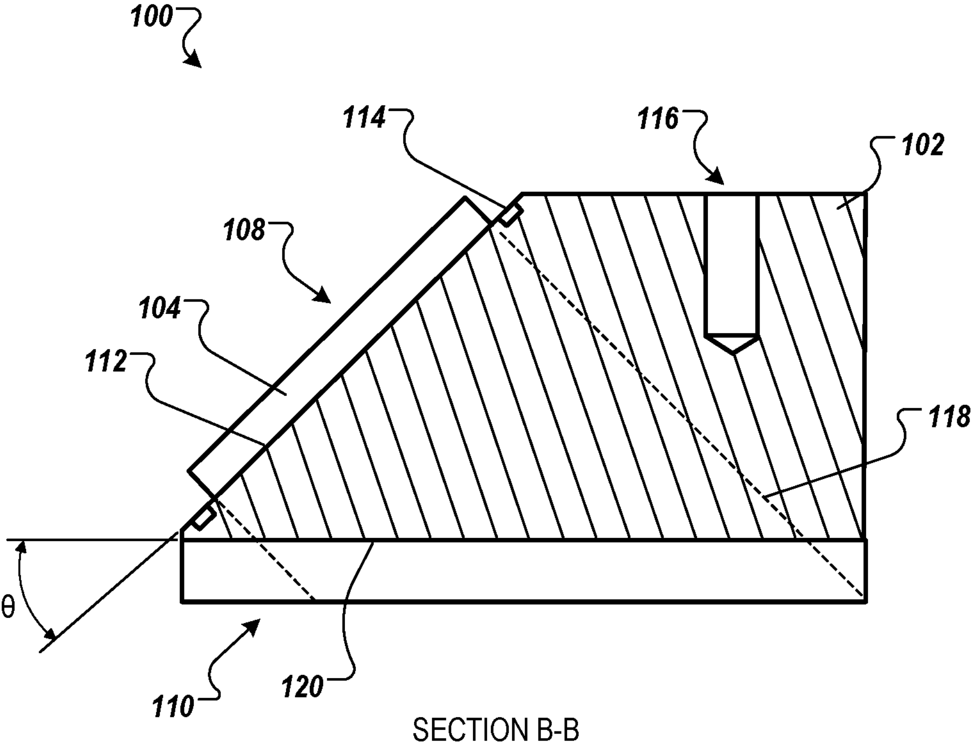

FIGS. 1A to 1D show various views of an example ultrasonic assembly 100 according to principles of the present disclosure. More specifically, FIGS. 1A and 1B are three-dimensional views of the ultrasonic assembly 100, FIG. 1C is a front view of the ultrasonic assembly 100, and FIG. 1D is a cross-sectional view taken along the section line B-B in FIG. 1C. The ultrasonic assembly 100 includes a waveguide 102 and an ultrasonic transducer 104, e.g., a piezo element, mounted to the waveguide 102 by a layer of adhesive, e.g., epoxy. For example, the ultrasonic assembly 100 can be used in the ultrasonic sensor 400 described in reference to FIGS. 4A to 4C and the ultrasonic flow sensor 500 described in reference to FIGS. 5A to 5C, respectively.

The waveguide 102 of FIGS. 1A to 1D is formed with a solid core or body. As used in the present disclosure, "solid" means that the waveguide is monolithic or unitary, e.g., formed by a single piece of material having uniform density with no material voids. A single piece or body can focus the energy generated by the ultrasonic transducer 104 and improve transmissivity of ultrasonic waves through the waveguide by reducing or eliminating alternate impedance, reflections, and/or refractions within the waveguide 102.

By using a solid core or body, e.g., a monolithic body, the waveguide 102 can have an improved performance. For instance, since air bubbles, gaps, and other imperfections in a waveguide can reduce performance, e.g., when the waveguide is manufactured from multiple pieces, the waveguide 102 can have an improved performance by having a solid core or body. The solid core or body can have a reduced likelihood of having air bubbles, gaps, or other imperfections that can affect movement of ultrasonic waves through the waveguide 102.

In some implementations, the waveguide 102 is formed with one block of material that is machined to a predetermined size or shape. This can reduce manufacturing time, cost, or both, e.g., compared to systems with a hollowed core that is filled with epoxy. In some implementations, the waveguide 102 is formed using injection molding techniques. For example, the body can be formed of a piece of plastic, e.g., acrylonitrile butadiene styrene (ABS) plastic. Using ABS plastic for the waveguide 102 may provide one or more of the following advantages. ABS plastic can provide a reasonable coupling to the ultrasonic transducer 104 in terms of acoustic properties, mechanical properties, or both. For example, ABS plastic has a low thermal expansion coefficient that can increase the integrity of the bond between the transducer 104 and waveguide 102. The surface of ABS plastic can adhere well to the transducer 104, as also described below. ABS plastic can have a relatively low acoustic attenuation factor, which may be useful for preventing signal loss. ABS and other plastics can be easily machined, can be relatively inexpensive, or both. Other examples of suitable materials can include high-density polyethylene (HDPE) polycarbonate or polypropylene plastics.

In some implementations, the waveguide 102 can have a similar acoustic impedance as that of the pipe to which the waveguide 102 is adapted to attach. For instance, by using ABS or a similar material, the waveguide 102 can have a similar impedance as that of the pipe to which the waveguide 102 can attached. This can improve water flow detection for the ultrasonic assembly 100.

The waveguide 102 couples the ultrasonic transducer 104 to another structure and acts as a conduit of energy between the transducer 104 and the structure. For example, the ultrasonic assembly 100 can be used to measure the flow of fluid through a pipe, as described in more detail in reference to FIGS. 5A to 5C and 6A and 6B. The waveguide 102 couples the ultrasonic transducer 104 to the pipe and guides the ultrasonic waves generated by the transducer 104 through the pipe wall and into the medium flowing through the pipe (e.g., water). Similarly, the waveguide 102 guides ultrasonic waves reflected from the opposite wall of the pipe back to the ultrasonic transducer 104. In some instances, the ABS plastic, the material of the pipes, and the water flowing in the pipes may have a similar acoustic impedance which can be useful for maximizing signal propagation.

For this purpose, the waveguide 102 includes a transducer mounting section 108 and a coupling section 110. As shown, e.g., in FIG. 1D, the transducer mounting section 108 can include an angled mounting surface 112 for the waveguide 102 and a circular trough or groove 114 formed in the mounting surface 112. The trough 114 can aid in alignment of the transducer 104 relative to the mounting surface 112. For example, the trough 114 can form a circle (FIGS. 1A and 1B) that is slightly larger than the transducer 104, and the transducer 104 can be mounted inside of the circle. However, in other implementations, the trough 114 may have a non-circular shape.

In some implementations, the waveguide 102 can include a coupling device. The coupling device can be an attachment section 116, e.g., a threaded bore, for attaching a housing to a waveguide 102 (FIGS. 4A to 4C). As shown in FIG. 1D, the attachment section can be formed so as not to intersect a projected area 118 of the transducer 104. The projected area 118 represents a volume of the waveguide 102 in which the waveform transmitted by the ultrasonic transducer 104 may have a greater effect than in other parts of the waveguide 102. Moving the attachment section 116 away from the projected area 118 may reduce interference or wave distortion in some instances.

The waveguide 102 can be designed so that the mounting surface 112, and thus the mounted transducer 104, is arranged at an angle θ relative to the coupling section 110 (FIG. 1D). Thus, the transducer 104 can be arranged at an angle relative to the structure to which the waveguide 102 is coupled. This arrangement can allow the ultrasonic waves generated by the transducer 104 to be propagated at an angle and reflected, e.g., to measure the flow rate of a target medium, as described below in reference to FIGS. 6A and 6B. For example, if a waveguide 102 has a coupling section 110 with a flat bottom surface (FIG. 1A), the mounting surface 112 for the transducer 104 forms an angle relative to the flat bottom surface. The specific size of the angle θ can be selected using one or more of the wave frequency, the core dimensions, and the speed of sound in the waveguide.

As described in more detail in the following, implementations of the ultrasonic assembly 100 can include a coupling section 110 with a concave curved surface 120 (FIG. 1C)

configured to receive a section of pipe. In this context, "concave" is used to mean that the surface curves inwardly, e.g., into the body and towards the transducer mounting section 108. In such implementations, the mounting surface 112 forms an angle relative to a projected surface 122 corresponding to the curved surface 120 (FIG. 1B). For both a flat bottom surface and a concave curved surface 120, the mounting surface 112 forms an angle θ relative to a center line of the bottom surface, as shown in FIG. 1D.

In some implementations, the coupling section 110 has a curved surface 120 having a radius (R) of curvature (FIG. 1C) that is larger than the outer radius of standard, e.g., average or median, pipe sizes. For example, pipe diameters for water mains can range from 6 to 16 inches, e.g., 8, 10, or 12 inches. For such applications, the radius (R) of curvature of the curved surface 120 can be greater than 8 inches. In contrast, pipes used in homes, offices, and other buildings may vary in size from 0.5 inches to 6 inches. For such applications, the radius (R) of curvature can be greater than 3 inches. By selecting a radius (R) of curvature that is larger than the largest pipe, a single waveguide 102 can be mounted to a variety of pipes while still accommodating the curvature of the outer surface. Selecting the radius R of curvature that is larger than the largest pipe can increase a likelihood that the coupling section 110 will have a larger contact surface area than selection of a different radius. Increasing the contact surface area can reduce a likelihood of interference with the ultrasonic waves caused by the contact between the coupling section 110 and the pipe. However, in other implementations, the radius (R) of the curvature may be adapted to the specific size of a target pipe. Such implementations may improve the contact patch formed between the wave guide and the outer surface of the pipe and improve overall alignment of the waveguide 102 relative to the pipe.

In some implementations, during installation, a grease can be applied between the coupling section 110 and the pipe. The grease, e.g., magnalube, can improve the contact between the coupling section 110 and the pipe, reducing interference with the ultrasonic waves.

According to some implementations, the ultrasonic transducer 104 of the ultrasonic assembly 100 includes a piezoelectric transducer, e.g., a piezoelectric disk. Piezoelectric materials change size and shape when a voltage is applied. For example, when AC voltage is applied, the piezoelectric material oscillates to produce ultrasonic sound waves. Conversely, piezoelectric materials generate a voltage when force is applied. Accordingly, the piezoelectric material can generate a voltage in response to ultrasonic sound waves to act as a sensor. Thus, piezoelectric materials can be used for ultrasonic transmitters, ultrasonic receivers, or for combined ultrasonic transceivers. The principles of the present disclosure can be applied to all three types of transducer. As shown, e.g., in FIG. 1A, the piezoelectric disk may have both electrodes 124 on a common face for applying or receiving voltage.

As described in more detail with reference to FIG. 1D, the ultrasonic transducer 104 is bonded to the mounting surface 112 of the waveguide 102 by a layer of adhesive (e.g., epoxy adhesive). The adhesive can cover the entire surface of the transducer 104 that faces the mounting surface 112 such that the ultrasonic wave can travel from the entire surface of the transducer 104 into the waveguide 102. The trough 114 can accommodate excess adhesive that may flow out from under the transducer 104 during the manufacturing process. In some cases, the trough 114 may not be as wide or deep as is depicted in the figures.

Figure 2:
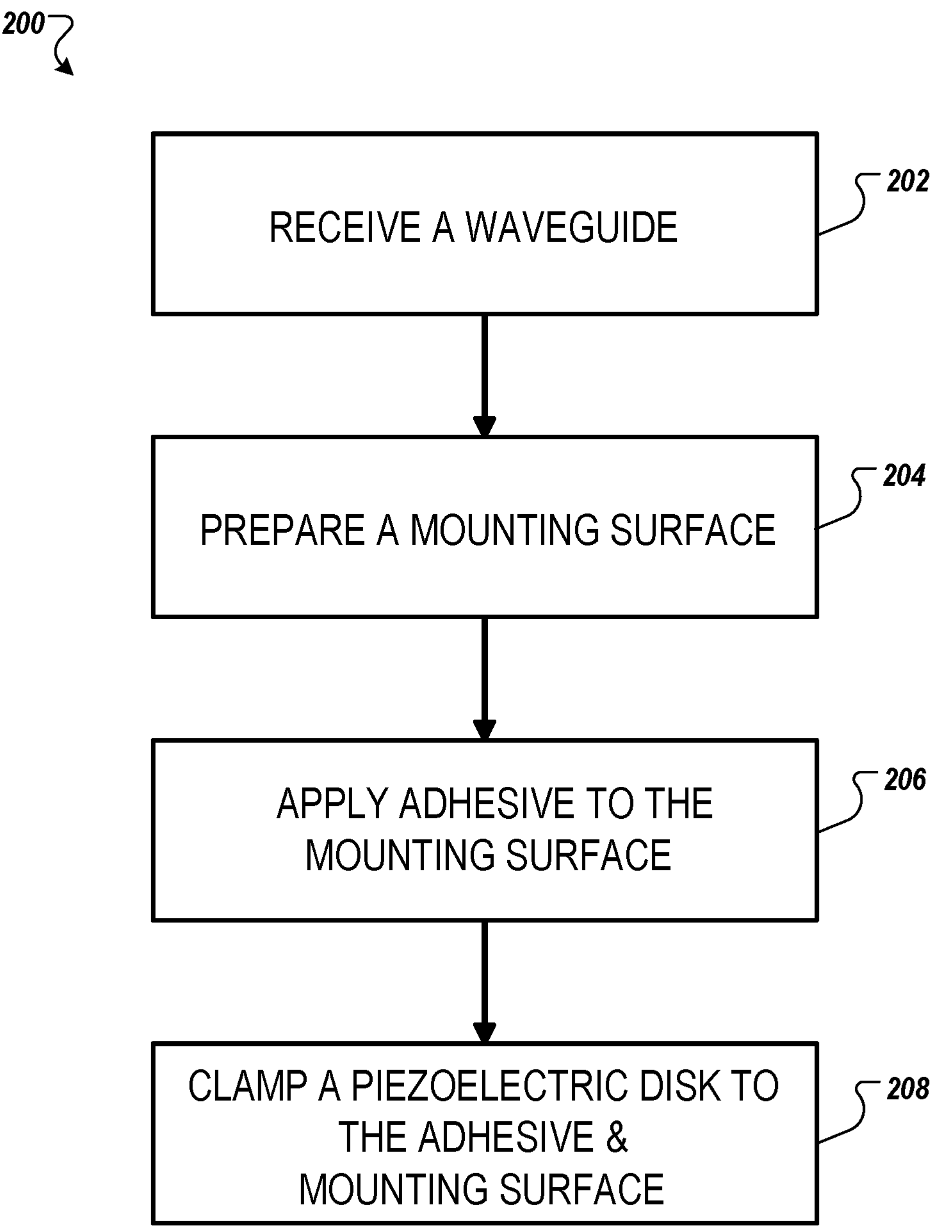
FIG. 2 is a flowchart of an example process for manufacturing an ultrasonic assembly.

FIG. 2 is a flowchart of an example process 200 for manufacturing ultrasonic assemblies. For example, the process 200 can be used to manufacture the ultrasonic assembly 100 of FIGS. 1A to 1D. The process 200 can include: receiving a waveguide (202); preparing a mounting surface (204); applying adhesive to the mounting surface (206); and clamping a piezoelectric disk to the adhesive and mounting surface (208).

Some implementations of the process include receiving a waveguide. For instance, the waveguide may be the waveguide 102 described above in reference to FIGS. 1A to 1D. The waveguide can include a solid, monolithic, or unitary body of material. The waveguide can include a coupling section for mounting the waveguide to another structure and a mounting section for mounting a piezoelectric disk. The mounting section can include a mounting surface for receiving the piezoelectric disk. The mounting surface can form an angle relative to the coupling section, e.g., of about 45°, as described herein. In some implementations, the coupling section can have a concave curved surface adapted to the outer surface of a pipe or tube.

In some instances, receiving the waveguide includes receiving a piece, e.g., a rectangular block, of low-impedance material such as ABS plastic. The block can be machined to form the mounting section as previously described. For example, a flat surface that forms a predetermined angle relative to the bottom surface of the plastic block can be machined. In some instances, the angled mounting surface can be further machined to provide a groove or trough. Once the mounting section has been formed, the coupling section can be formed by using a machining process to cut a curved surface that curves inwards towards the mounting section. As described above, the curved coupling surface can have a radius of curvature that couples with, e.g., is adapted to couple with, the outer curvature of a water pipe, for example. In this context "adapted to" can mean that the coupling surface is dimensioned to receive or curve around the outer surface or the pipe, or the coupling surface is dimensioned to match the shape of the pipe's outer surface.

In some implementations, a waveguide having the features previously described can also be formed using an injection molding process.

The manufacturing process can further include preparing a mounting surface for mounting the piezoelectric disk. For example, the mounting surface may be cleaned or lightly sanded. Similarly, the corresponding surface of the piezoelectric disk can also be cleaned and optionally lightly sanded in some cases.

Some implementations of the process include applying adhesive to the mounting surface. For example, a dot of epoxy may be applied to the mounting surface. The quantity of applied epoxy can be selected to cover the entire lower surface of the piezoelectric disk to provide full waveform transmission and a strong mechanical bond between the piezoelectric disk and waveguide. The epoxy layer can extend just past the outer perimeter of the piezoelectric disk. The trough or groove in the mounting surface can catch overflow of the epoxy, but the quantity of epoxy may be selected so that any overflow does not extend past the trough. Some epoxies have a composition that, when cured, has a low impedance to ultrasonic frequencies and thus prevents the ultrasonic sound waves from migrating into other components of the assembly besides the waveguide. In some cases, the epoxy can be degassed before application to the mounting surface.

Figure 3A:
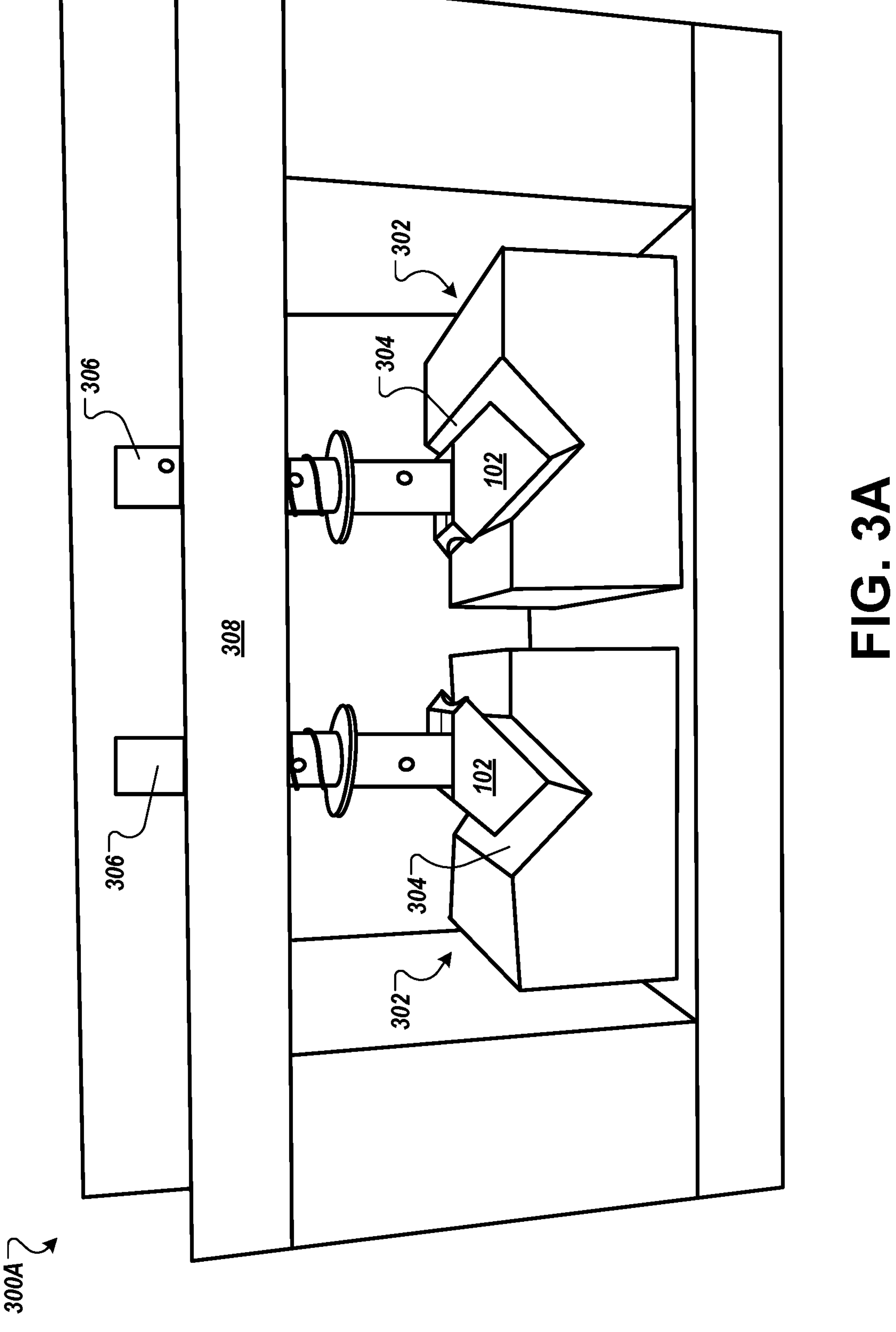
FIGS. 3A and 3B show examples of devices that can be used to manufacture waveguide assembles according to principles of the present disclosure.
Figure 3B:
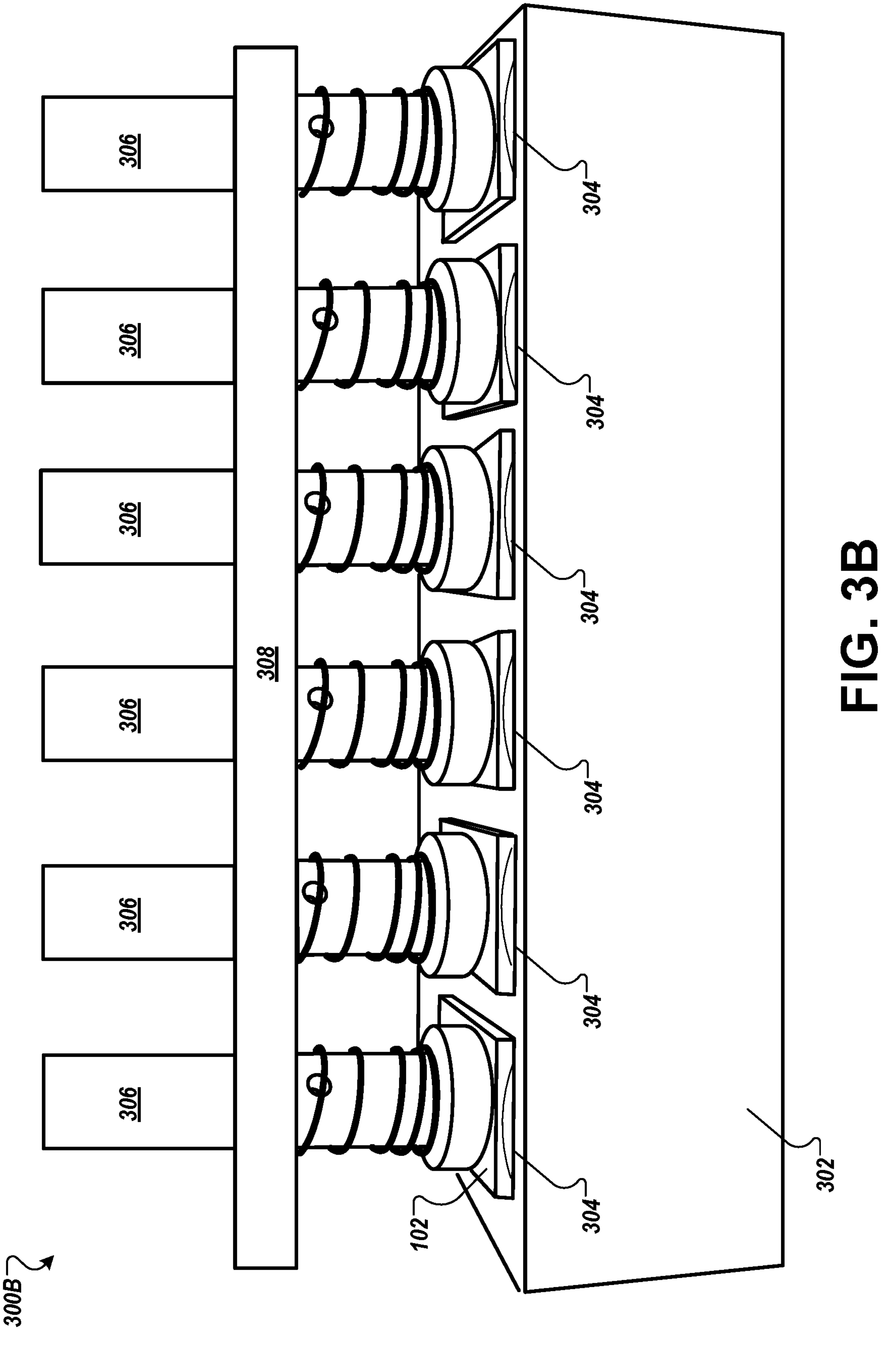

Some implementations of the process include clamping a piezoelectric disk to the adhesive and mounting surface. FIGS. 3A and 3B show examples of devices 300A, 300B that can be used to manufacture ultrasonic assemblies, e.g., according to the process of FIG. 2. In both FIGS. 3A and 3B, a clamping device 300A, 300B includes a jig 302 that defines several recesses 304 that are each shaped to receive a waveguide 102 and transducer after epoxy has been applied between the waveguide 102 and transducer. For each recess 304, a spring-loaded piston 306 is mounted in a carrier plate 308 opposite the recess 304. The spring biases the piston 306 downwards, towards the waveguide 102 and applies downward pressure that clamps the transducer and the waveguide 102 as the adhesive dries or cures. In FIGS. 3A and 3B, the recesses 304 are designed so that the transducer faces the piston 306, with an end face of the piston 306 bearing down directly on the transducer. However, the recesses can be designed, e.g., so that the mounting section is arranged at the bottom of the recess, and the end face of the piston bears down on a surface of the waveguide opposite the mounting section.

Clamping the transducer to the waveguide as the adhesive dries or cures can flatten out the adhesive layer to reduce or eliminate air bubbles in addition to the degassing step described above. Clamping can thin out the layer of adhesive, which can generally reduce the potential for imperfections that may have an adverse effect on the propagation of ultrasound waves through the adhesive layer. In some examples, clamping the transducer to the waveguide may ensure better alignment between the transducer and waveguide in the finished assembly.

In some implementations, the process includes applying solder to the electrodes of the transducer, as shown for example in FIG. 1A. For example, solder can be applied at a low temperature, e.g., of 300° C., for 1 second to prevent vaporizing a thin coating that may be provided on the piezoelectric disk.

In some implementations, the process includes inserting the ultrasonic assembly in a sensor housing to form an ultrasonic sensor. FIGS. 4A to 4C show various views of an example of such an ultrasonic sensor 400. More specifically, FIG. 4A is a three-dimensional view of the ultrasonic sensor 400, FIG. 4B is a front view of the ultrasonic sensor 400, and FIG. 4C is a cross-sectional view taken along the section line A-A in FIG. 4B. The ultrasonic sensor 400 can be used, e.g., in the ultrasonic flow sensor 500 depicted in FIGS. 5A to 5C.

As shown in FIG. 4C, the sensor housing 402 can define an internal space 404 sized to receive the ultrasonic assembly 100 with a relatively tight fit. A top surface of the housing 402 can include a mounting device 406 that aligns with the attachment section 116 of the waveguide 102. In some examples, the mounting device 406 can be an aperture that receives a connecter, e.g., a screw. In some implementations, the housing 402 can include a threaded rod or other retention feature for engaging the ultrasonic assembly 100, e.g., as part of the mounting device 406. The top housing surface can include one or more apertures 408 or other features for receiving the leads that connect to the electrodes of the transducer 104, as described below in more detail.

The sensor housing 402 can include an open side 410 so that the coupling section 110 of the waveguide 102 is exposed. In some cases, the sensor housing 402 is shaped to fully enclose the waveguide 102, e.g., the waveguide 102 does not protrude from the sensor housing 402. The housing 402 can include a housing coupling section 412 that is adapted to the shape, e.g., curvature, of the coupling section 110 of the waveguide 102 (FIGS. 4A and 4B).

Figure 5A:
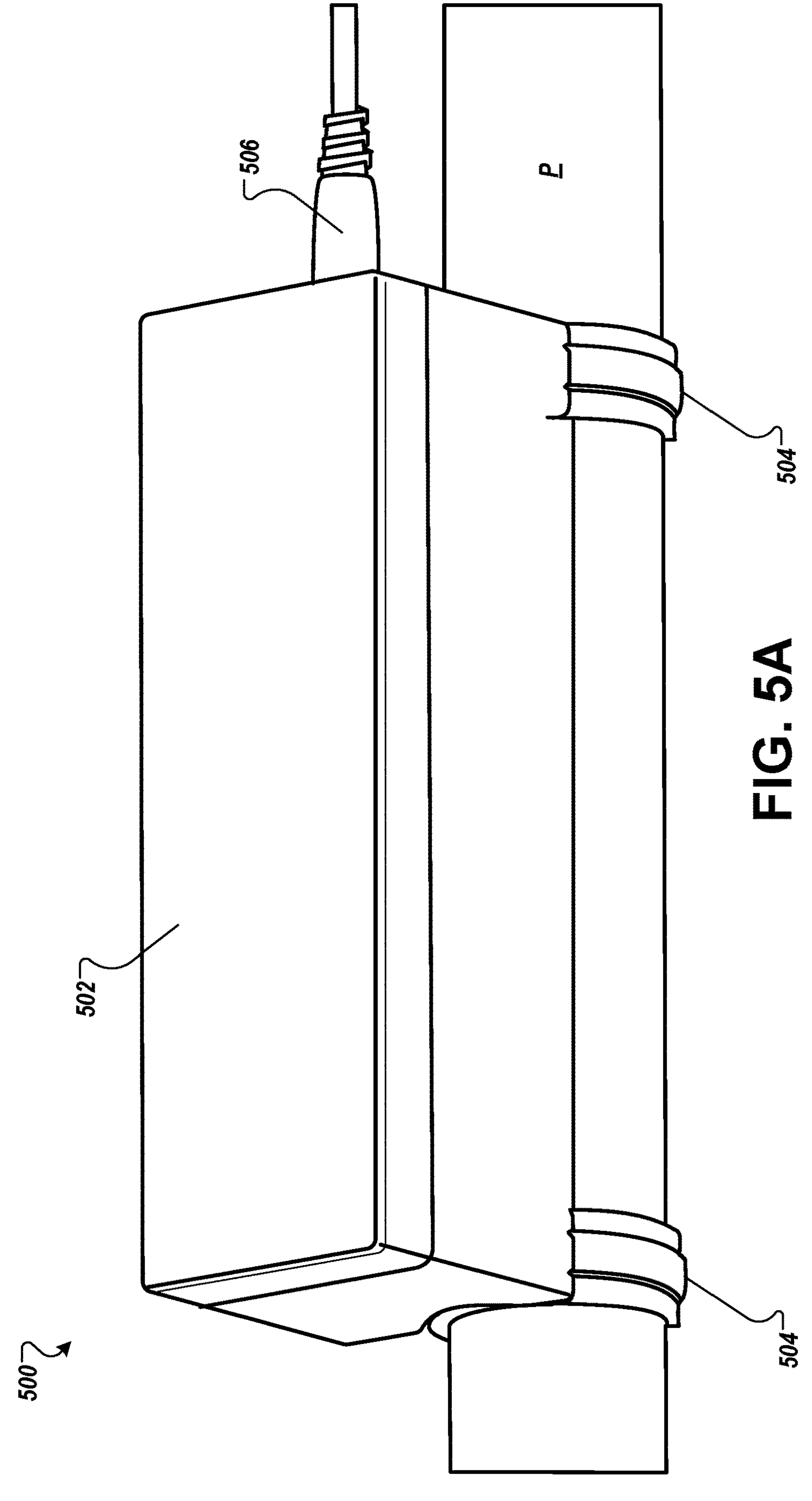
FIGS. 5A to 5C show various views of an example ultrasonic flow sensor according to the principles of the present disclosure.
Figure 5B:
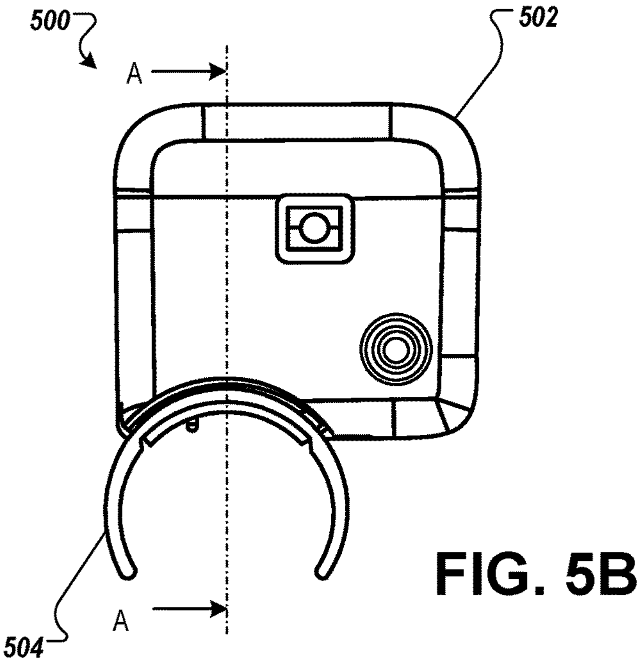
Figure 5C:
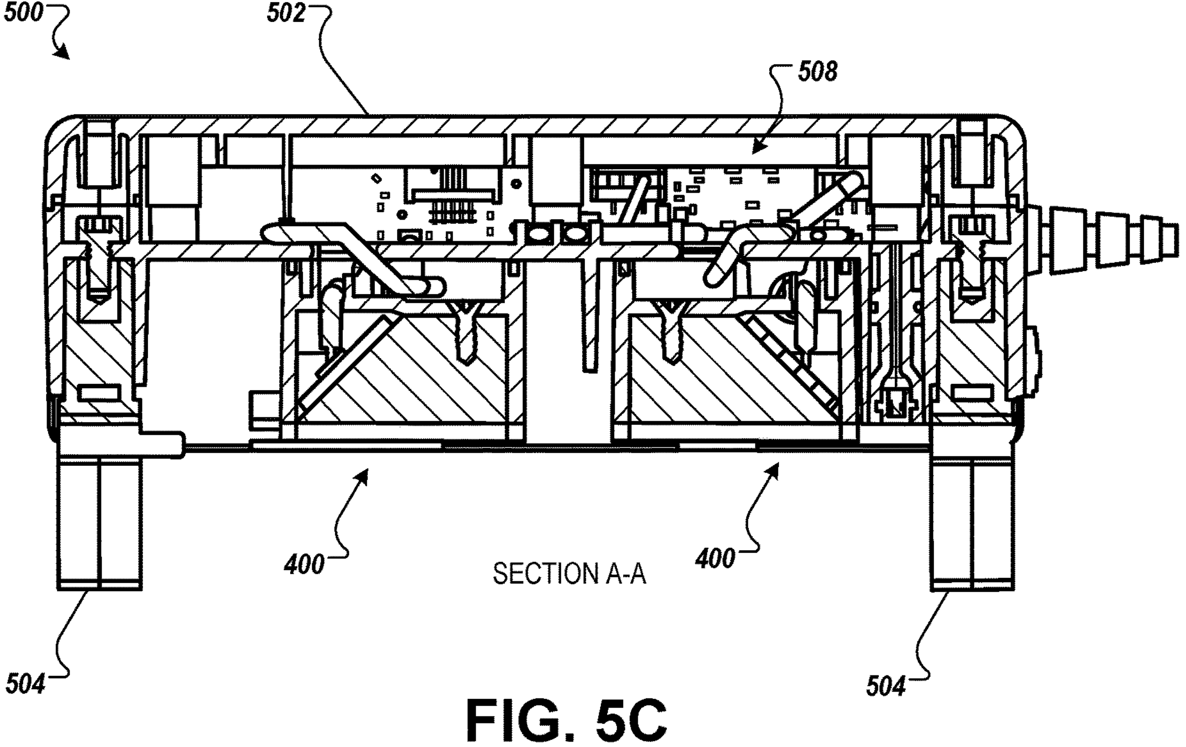

As shown in FIG. 4A, the sensor housing 402 can include engagement arms 414 or similar features for connecting the sensor housing 402 to a further device, e.g., the outer housing 502 of the ultrasonic flow sensor 500 of FIGS. 5A to 5C. Engagement arms 414 or other snap fit features that do not require the use of special tools can make assembly of the larger device faster and easier. In some implementations, the ultrasonic assembly 100 of the present disclosure can be directly integrated into the ultrasonic flow sensor 500 or other device without the intermediate sensor housing 402 depicted in FIGS. 4A to 4C.

FIGS. 5A to 5C show various views of an example ultrasonic flow sensor 500. More specifically, FIG. 5A is a three-dimensional view of the flow sensor 500 coupled to the outer surface of a pipe (P), FIG. 5B is a front view of the ultrasonic flow sensor 500, and FIG. 5C is a cross-sectional view taken along the section line A-A in FIG. 5B. For example, the ultrasonic flow sensor 500 can include the ultrasonic assembly 100 of FIGS. 1A to 1D and/or the ultrasonic sensor 400 of FIGS. 4A to 4C.

As shown in FIG. 5A, the flow sensor 500 can include an outer housing 502 that attaches to the outer surface of a pipe via a pair of pipe clips 504. The pipe clips 504 may be open at one end opposite the outer housing 502 (FIG. 5B) and formed of a deformable material that allows the clips 504 to snap around the outer surface of the pipe (P). The flow sensor 500 can include an electric plug 506 or connector, e.g., for supplying power to the electronics 508 of the flow sensor 500.

Referring now to FIG. 5C, the internal design of the flow sensor 500 is shown. More specifically, the outer housing 502 can be configured to receive two ultrasonic sensors 400 in mirrored configuration and a controller, e.g., electronics 508, that connect to the transducers 104 of each ultrasonic sensor 400. For example, the electronics 508 can be configured to apply AC voltage to the transducers 104 to generate ultrasonic waves, as previously described. In some examples, the electronics 508 can be configured to detect the voltage generated by the transducers 104 in response to exposure to ultrasonic waves. In some implementations, the electronics 508 can be configured to drive the ultrasonic transducers 104 at a frequency that is different from the resonant frequency of the transducers. This may reduce the effect of any impedance mismatch between the electronics 508 and the transducers 104 or make the transmission and reception performance across multiple units of the flow sensor 500 more consistent in some cases.

A bottom surface of the outer housing 502 adjacent to the pipe clips 504 can be designed so that the coupling sections 110 of the sensors are exposed to and face the outer surface of the pipe (P). More specifically, the pipe clips 504, the outer housing 502, and the ultrasonic sensors 400 can be arranged relative to one another so that attaching the pipe clips 504 to the outer surface of the pipe holds the coupling sections 110 of the respective waveguides 102 towards the outer surface of the pipe (P). In some instances, a wet or dry acoustic couplant can be applied to the surfaces of the coupling sections 110 to act as an acoustic couplant interface between the waveguides 102 and the outer surface of the pipe (P).

Referring, e.g., to FIG. 5C, the position of one of the sensors 400 is fixed relative to the housing, while the other sensor 400 can be moved in the longitudinal direction within the housing 502, e.g., along a guide. For example, the housing 502 can include one or more locking mechanisms, e.g., detents, (not shown) that engage the engagement arms 414 of the sensor housing 402 at two fixed positions. The fixed positions can be adapted to different diameters or types of pipe. The detents may be provided for ease of installation and accurate positioning but are not required for the flow sensor 500 to measure liquid flow through the pipe P.

In some instances, the flow sensor 500 can include a side screw (not shown) for adjusting and/or locking a position of one of the sensors 400. Some implementations can include both detents and a side screw. The different spacing between the sensors 400 within the outer housing 502 allows the sensor 400 to sense flow in different configurations (e.g., FIGS. 6A and 6B) and for different pipe diameters. Even as the distance between the sensors 400 changes, the outer housing 502 maintains the sensors 400 in proper alignment to one another, which can improve the accuracy of the ultrasonic flow sensor 500 in some cases.

As described above, the top surface of the sensor housing 402 can include one or more apertures 408 or other features for routing the leads of the sensors 400. As the sensors 400 are moved along different positions, the features allow the leads to be routed in a way that prevents the leads from being pulled or crimped.

Figures 6A, 6B:
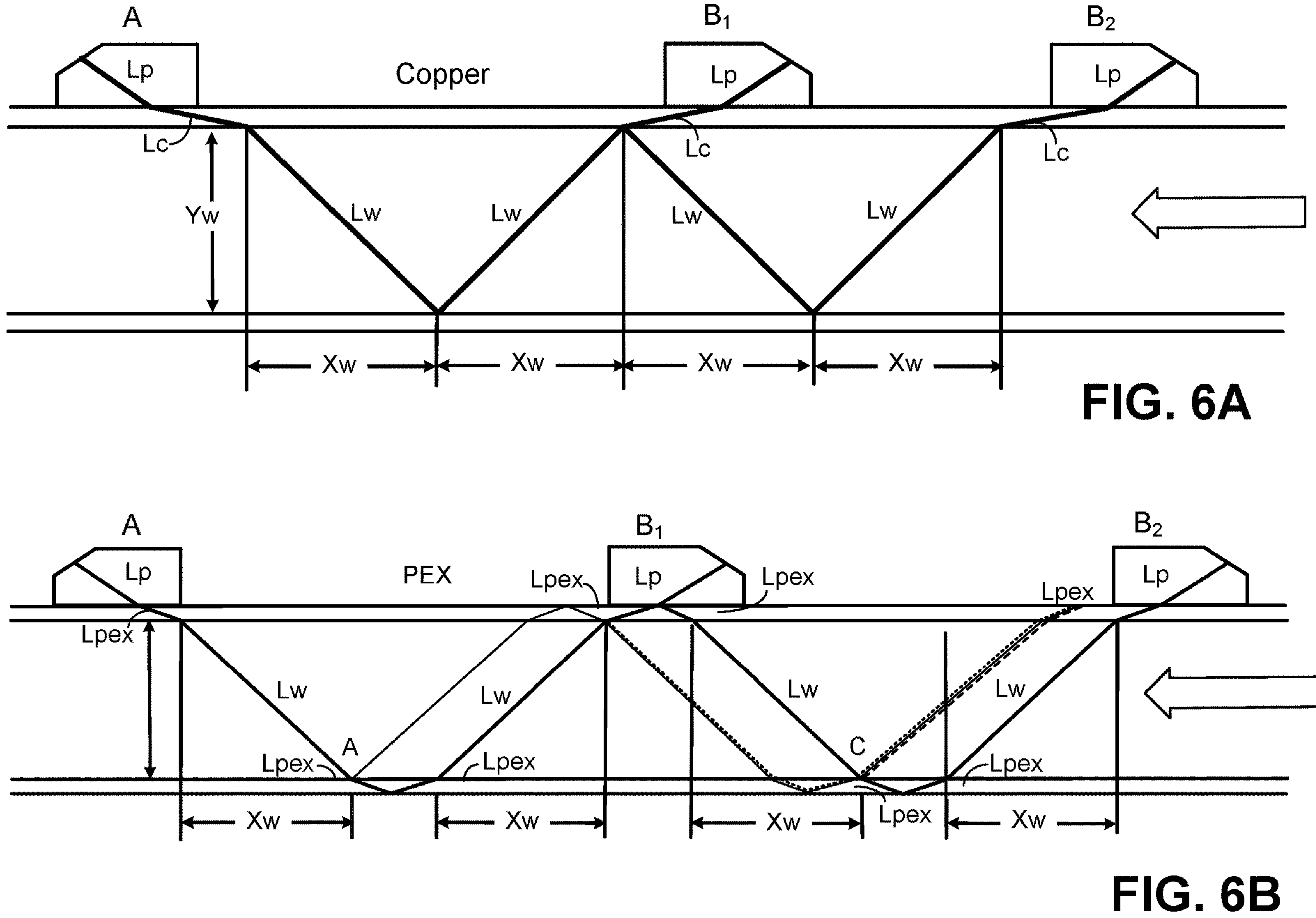
FIGS. 6A and 6B show various aspects of measuring liquid flow through a pipe according to the principles of the present disclosure.

FIGS. 6A and 6B show various aspects of measuring liquid flow through a pipe according to the principles of the present disclosure. In each of FIGS. 6A and 6B, two ultrasonic sensors are mounted to the outside of a pipe. The pipes are made of copper and cross-linked polyethylene (PEX), respectively. However, the described techniques are not limited to these two materials of pipes. For example, the pipes can be made of chlorinated polyvinyl chloride (CPVC) in some instances. In some instances, the ultrasonic sensors may be part of the ultrasonic flow sensor 500 show in FIGS. 5A to 5C.

The ultrasonic sensors are mounted at positions A and B, respectively. The ultrasonic sensors can be the ultrasonic sensors 400 of FIGS. 4A to 4C or the ultrasonic assemblies 100 of FIGS. 1A to 1D. A distance between positions A and B can depend on a material, diameter, thickness, or a combination of these, of the pipe onto which the ultrasonic sensors mount. For instance, when the ultrasonic sensors mount to a copper pipe, a first distance between the ultrasonic sensors might be different than a second distance between the ultrasonic sensors when mounted to a CPVC pipe. In some implementations, there can be two optimal distances between positions A and B for the ultrasonic sensors.

The ultrasonic sensor at position B can be moved between a first position $B_1$ and a second position $B_2$. Ultrasonic sound waves move between the ultrasonic sensors and through the medium flowing through the pipe, as indicated by the arrow. The sensors 400 can be locked in the positions $B_1$ and $B_2$ by a combination of engagement arms and detents, as described above.

In some implementations, then the ultrasonic sensors have two optimal distances between positions A and B, the ultrasonic flow sensor can include a coupling device, e.g., the engagement arms and detents, for the two optimal distances between positions A and B. For instance, a first ultrasonic sensor can be fixed in place at position A while the second ultrasonic sensor has a first coupling device at the first position $B_1$ and a second coupling device at the second position $B_2$. The first coupling device and the second coupling device can be adapted to substantially maintain the second ultrasonic sensor at the corresponding position.

The path of the reflected ultrasonic sound waves can make the shape of a "V" or a "W." The shape of the reflected ultrasonic sound waves can depend on the material, diameter, thickness, or a combination of these, of the pipe onto which the ultrasonic sensors mount. Since other sound wave shapes are possible, the positions A and B are selected so that the path of the reflected ultrasonic sound waves are most likely to make the shape of a "V" or a "W."

Whether the ultrasonic wave follows a "V" or a "W" pattern can depend from the sensor spacing, the pipe material, and the pipe diameter. Table 1, below, lists example configurations that result in different wave patterns:

TABLE 1

Example Sensor and Pipe Configurations

| Diameter [in.] | Material | Spacing | Pattern |
|---|---|---|---|
| ¾" | Copper | $B_1$ | W |
| 1" | Copper | $B_2$ | W |
| ¾" | Copper | $B_1$ | W |
| 1" | Copper | $B_2$ | W |
| ¾" | PEX | $B_2$ | W |
| 1" | PEX | $B_1$ | V |
| ¾" | CPVC | $B_2$ | W |
| 1" | CPVC | $B_1$ | V |

In some implementations, the sensors can be arranged on opposite sides of the pipe P, such that the reflected waves form a "Z" pattern.

Although FIGS. 5A, 5B, 6A, and 6B show implementations in which one ultrasonic sensor has a fixed position and the other ultrasonic sensor is moveable, in some implementations, both ultrasonic sensors may be moved relative to one another and the outer housing 502 of the flow sensor 500.

For example, the ultrasonic assembly 100 of FIGS. 1A to 1D and/or the ultrasonic sensor of FIGS. 4A to 4C can be used to measure liquid flow through a pipe.

In some implementations, installation, configuration, or both, of the ultrasonic flow sensor onto an existing pipe, e.g., without cutting or welding to the existing pipe, can be facilitated using an application.

FIG. 7 depicts an example process 700 for configuring an ultrasonic flow sensor 704. Various parts of the process 700 can be performed as an installation application 702 for the ultrasonic flow sensor 704. Some parts of the process 700 can be performed by a backend 706, e.g., implemented in one or more computers. Some part of the process can be performed by the ultrasonic flow sensor 704, e.g., one or more processors included in the ultrasonic flow sensor 704.

As described in process 700, the installation application 702 and the ultrasonic flow sensor 704 can communicate. In some implementations, the communication between the installation application 702 and the ultrasonic flow sensor 704 is by way of at least the backend 706, e.g., and optionally other devices such as routers and other network devices. In some examples, the installation application 702 and the ultrasonic flow sensor 704 communicate without sending the communications through the backend 706. This communication can be direct, e.g., using a communication protocol that does not require other devices. The communication can be by way of one or more local networking devices, e.g., a wireless router.

The process 700 includes mounting the ultrasonic flow sensor 704 (708). The ultrasonic flow sensor 704 can be mounted to a pipe, a pipe branch, or a pipe sub-branch. In some examples, a device can present instructions on where to mount the pipe, e.g., visible, audible, or both, instructions. Visible instructions can be presented on a display connected to the device.

For instance, a device used by an installer can include the installation application 702. The installation application 702 can be specific to the ultrasonic flow sensor 704. In some examples, the installation application 702 can provide access to data for the ultrasonic flow sensor 704 after installation, e.g., alerts about water usage, potential leaks, or other relevant information for the ultrasonic flow sensor 704.

The installation application 702 can receive input that indicates one or more properties for where the ultrasonic flow sensor 704 will be used. The properties can include a water system type.

The installation application 702 can present the instructions on where to install the ultrasonic flow sensor 704. For instance, the installation application 702, the backend 706, or a combination of both, can use the one or more properties for where the ultrasonic flow sensor 704 will be used to determine a recommended mounting location for the ultrasonic flow sensor 704.

The installation application 702 can present instructions on how to install, e.g., couple, the ultrasonic flow sensor 704 on a pipe. For instance, the installation instructions can indicate a pipe in a property onto which the ultrasonic flow sensor 704 should be installed. The pipe can be an input pipe that brings water into the property from the utility company, after a water meter or well system. The installation instructions can include a location on the pipe, other relevant instructions, or a combination of both. The presentation of instructions can include one or more images for the installation process.

The process 700 provides configuration data (710). For example, the installation application 702 can prompt a user for input of a pipe type, a pipe diameter, or both. The pipe type can indicate a material from which the pipe is made. The installation application 702 can prompt a user for other appropriate types of input. The installation application 702 can receive input from a user that indicates at least some of the configuration data.

The process 700 receives the pipe configuration data (712). For instance, the ultrasonic flow sensor 704 receives the pipe configuration data from the device executing the installation application 702.

The ultrasonic flow sensor 704 can use the pipe configuration data to configure one or more settings of the ultrasonic flow sensor 704. The ultrasonic flow sensor 704 can use the settings to detect flow of liquid, e.g., water, in the pipe to which it attaches. One example of a setting can include a sensor spacing.

The process 700 determines a sensor spacing (714). For example, the ultrasonic flow sensor 704 can have two settings for a distance between the two sensors. The ultrasonic flow sensor 704 can determine a recommended distance, from two potential distances, for the distance using the pipe configuration data, e.g., as described in more detail above.

The ultrasonic flow sensor 704 can switch between the two distance settings and corresponding pipe configurations automatically, e.g., in response to analyzing the pipe configuration data. In some examples, the ultrasonic flow sensor 704 can include a switch, e.g., mechanical or software based, that switches between the two configurations.

The process 700 can receive sensor spacing data (716). For instance, in implementations that include a switch, the ultrasonic flow sensor 704 can provide data that identifies one of the two distance settings for the switch to the device executing the installation application 702. The installation application 702 can use the received data to cause presentation of the recommended distance, e.g., audibly or visually or both.

In some implementations, the sensor is mounted after the process 700, e.g., the installation application 702, receives the sensor spacing data. For instance, the installation application 702 can receive the sensor spacing data and, in response, provide an instruction on how to set the sensors in the ultrasonic flow sensor 704 at the recommended distance. The installation application 702 can present one or more instructions on how to physically install the ultrasonic flow sensor 704 onto the pipe.

The process 700 can configure the physical sensor (718). For instance, presentation of the recommended distance can prompt the user to select the one of the two distance settings for the recommended distance. The installation application 702 can receive input that indicates that the ultrasonic flow sensor 704 was installed, was configured at the recommended distance, or both.

The process 700 includes closing the main water valve (720). For example, the installation application 702 can present an instruction that indicates that the main water valve should be closed. The instruction can indicate that water should remain in the pipe, e.g., so that ultrasonic signals propagate through the water, while the main water valve is closed. In response, the installation application 702 can receive input that indicates that the main water valve is closed. The installation application 702 can provide data to the ultrasonic flow sensor 704 indicating that the main water valve is closed.

In some implementations, the installation application 702 can communicate with the main water valve to cause the main water valve to close. For instance, when the main water valve is a smart water valve, the installation application 702 can send an instruction to the smart water valve that causes the smart water valve to close.

The process 700 includes calibrating the ultrasonic flow sensor 704 with the main water valve closed (722). This can include the ultrasonic flow sensor 704 emitting ultrasonic waves from one or both of the sensors, substantially concurrently, in parallel, or a combination of both. The ultrasonic flow sensor 704 can determine a time of flight for each of the ultrasonic waves. The ultrasonic flow sensor 704 can perform this calibration in response to receiving the data from the installation application 702 that indicates that the main water valve is closed.

The process 722 can include multiple calibration processes. For example, the process 722 can include a gain calibration process. When the ultrasonic flow sensor 704 completes the gain calibration process, the ultrasonic flow sensor 704 can send a message to the backend 706 that indicates that the gain calibration process is complete. The process 722 can include a zero flow calibration process. When the ultrasonic flow sensor 704 completes the zero flow calibration process, the ultrasonic flow sensor 704 can send a message to the backend 706 that indicates that the zero flow calibration process is complete. The process 722 can include a flow direction calibration process. Substantially concurrently with initiation of the flow direction calibration process, the ultrasonic flow sensor 704 can send a message to the installation application 702, e.g., by way of the backend 706, that indicates initiation of the flow direction calibration process.

The process 700 includes opening the main water valve (724). For instance, the installation application 702 can present an instruction that indicates that the main water valve should be opened. The installation application 702 can present this instruction automatically, e.g., after a predetermined time period, in response to receipt of a message from the ultrasonic flow sensor 704, or a combination of both. For example, once the ultrasonic flow sensor 704 detects all necessary ultrasonic waves, determines the times of flight for the ultrasonic waves, or both, e.g., completes the zero flow process, the ultrasonic flow sensor 704 can provide the message to the device executing the installation application 702.

The process 700 includes turning water on (726). This can include the installation application 702 presenting an instruction to run water using an appliance at the property at which the ultrasonic flow sensor 704 is installed. The appliance can be any appropriate appliance, such as a faucet, a toilet, a shower, or a hose. The installation application 702 can receive input indicating that the water was turned on. The installation application 702 can provide data to the ultrasonic flow sensor 704 indicating that water is turned on, e.g., and the main water valve is open.

The process 700 includes calibrating the ultrasonic flow sensor 704 with the main water valve open (728). The process 728 can include the flow direction calibration process. This can include the ultrasonic flow sensor 704 emitting ultrasonic waves from one or both of the sensors, substantially concurrently, in parallel, or a combination of both. The ultrasonic flow sensor 704 can determine a time of flight for each of the ultrasonic waves. The ultrasonic flow sensor 704 can perform this calibration in response to receiving the data from the installation application 702 that indicates that the water is turned on, e.g., and the main water valve is open. In some examples, the ultrasonic flow sensor 704 can perform this calibration in response to detecting a change in the properties of the water in the pipe, e.g., as the water begins moving. The ultrasonic flow sensor 704 can provide a message to the backend 706 that indicates that the flow direction calibration is complete once this calibration process is complete.

The process 700 includes determining a water flow direction, other sensor calibration settings, or both (730). For instance, the ultrasonic flow sensor 704 can use the data captured when the main water valve was open and the water was on, and the data captured while the main water valve was closed to determine the water flow direction. In some examples, the ultrasonic flow sensor 704 can use the data captured while the water was on and the data captured while the main water valve was closed to determine other calibration settings, such as time of flight settings for when water is running and water is not running, or expected flow rate for the water. In some examples, at least some of the process 730 can be completed as part of the process 728.

The process 700 includes waveform validation (732). For example, the ultrasonic flow sensor 704, or the installation application 702, can provide waveforms of the ultrasonic waves captured by the ultrasonic flow sensor 704 to the backend 706. The backend 706 can analyze the waveforms to determine a likelihood that the installation of the ultrasonic flow sensor 704 was performed correctly. For instance, using the waveforms, the backend 706 can determine a likelihood that the correct distance between the two sensors, pipe type, pipe thickness, or a combination of these, were used for the pipe configuration data. If not, the backend 706 can provide data to the installation application 702, the ultrasonic flow sensor 704, or both, that indicates one or more recommended changes to correctly configure the ultrasonic flow sensor 704. This can increase the accuracy of the ultrasonic flow sensor 704 measuring water and detecting potential leaks.

In some examples, the backend 706 receives at least some of the waveforms in response to a request. For instance, the backend 706 can determine to perform waveform validation and request waveforms from the ultrasonic flow sensor 704. In response, the backend 706 can receive the waveforms from the ultrasonic flow sensor 704.

The process 700 includes turning the water off (734). This can include the installation application 702 presenting an instruction to turn the water off. The installation application 702 can present the instruction after a predetermined period of time, e.g., at least one minute after the water was turned on. In some examples, the installation application 702 can present the instruction after receiving data from the ultrasonic flow sensor 704, e.g., by way of the backend 706, as a result of the ultrasonic flow sensor 704 capturing all necessary ultrasonic waves.

In some implementations, the installation application 702 can provide a message that indicates that the water was turned off to the backend 706. For instance, the installation application 702 can receive input that indicates that the water was turned off. In response, the installation application 702 can provide the water off message to the backend 706. In some examples, the backend 706 can begin the waveform validation process in response, e.g., request waveform captures from the ultrasonic flow sensor 704.

The order of steps in the process 700 described above is illustrative only, and configuring the ultrasonic flow sensor 704 can be performed in different orders. For example, mounting the sensor, e.g., step 708, can occur at any time before the calibration process begins, e.g., before step 722. For instance, step 708 can occur before step 710, 716, 718, 720, or 722. In some implementations, step 708 can occur substantially concurrently with any of steps 710-720.

In some implementations, the process 700 can include additional steps, fewer steps, or some of the steps can be divided into multiple steps. For example, the process 700 can include steps 712, 714, 722, 728, and 730 without the other steps. In some examples, the process 700 can include those steps along with 732.

In some implementations, the ultrasonic flow sensor 704 can automatically calibration over time to account for long term offsets due to aging. The ultrasonic flow sensor 704 can perform this process alone or in combination with another device, e.g., the backend 706 or a user device. The ultrasonic flow sensor 704 can look for a no-flow condition that lasts for at least one hour after any water flow event stops. After at least one hour, the ultrasonic flow sensor 704 can measure the offset over a predetermined time period, e.g., a five minute period. The ultrasonic flow sensor 704 can provide the measured offsets to the backend 706. The backend 706 can analyze the measured offsets to determine whether one or more settings on the ultrasonic flow sensor 704 should be adjusted. If so, the backend 706 can provide an instruction to the ultrasonic flow sensor 704 that causes the ultrasonic flow sensor 704 to change the one or more settings, e.g., an offset calibration value.

A number of implementations have been described. Nevertheless, it will be understood that various modifications may be made without departing from the spirit and scope of the disclosure. For example, various forms of the flows shown above may be used, with steps re-ordered, added, or removed.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular implementations of the invention have been described. Other implementations are within the scope of the following claims. For example, the steps recited in the claims, described in the specification, or depicted in the figures can be performed in a different order and still achieve desirable results. In some cases, multitasking and parallel processing may be advantageous.

The invention claimed is:

1. A system comprising:

a first ultrasonic assembly that includes a first waveguide formed by a first monolithic body, and a first ultrasonic transducer mounted to the first waveguide, wherein the first monolithic body includes a first mounting surface adapted to couple to the first ultrasonic transducer, a first housing surface, and a first coupling surface adapted to couple to an outer surface of a pipe and opposite the first housing surface;

a second ultrasonic assembly that includes a second waveguide formed by a second monolithic body, and a second ultrasonic transducer mounted to the second waveguide, wherein the second monolithic body includes a second mounting surface adapted to couple to the second ultrasonic transducer, a second housing surface, and a second coupling surface adapted to couple to the outer surface of the pipe, and the second ultrasonic assembly is a different assembly from the first ultrasonic assembly and opposite the second housing surface;

a housing that a) directly removably couples to the first housing surface of the first ultrasonic assembly and b) directly removably couples to the second housing surface of the second ultrasonic assembly, and c) does not extend past the first coupling surface of the first ultrasonic assembly that couples to the outer surface of the pipe;

an ultrasonic flow sensor that comprises the first ultrasonic assembly and the second ultrasonic assembly and is configured to monitor water flow in either a first direction or a second direction; and a controller configured to:

determine, using one or more first ultrasonic waves detected while water is not flowing through the pipe and one or more second ultrasonic waves detected while water is flowing through the pipe, one or more sensor calibration settings for the ultrasonic flow sensor that has a distance between the first ultrasonic assembly and the second ultrasonic assembly, including detecting, from the first direction and the second direction for the water flow, a flow direction calibration using the one or more first ultrasonic waves detected while water is not flowing through the pipe and the one or more second ultrasonic waves detected while water is flowing through the pipe; and cause the ultrasonic flow sensor to have the flow direction calibration using the one or more sensor calibration settings.

2. The system of claim 1, comprising a housing that couples to the first ultrasonic assembly and the second ultrasonic assembly, wherein:

the first ultrasonic assembly comprises a coupling device adapted to couple the first waveguide to the housing; and the first waveguide has an angle between the first mounting surface and the first coupling surface adapted to cause a majority of waveforms transmitted by the first ultrasonic transducer through an area that is not intersected by the coupling device.

3. The system of claim 1, comprising the housing that a) couples to the first ultrasonic assembly and the second ultrasonic assembly, and b) includes a housing guide, wherein at least one of the first ultrasonic assembly or the second ultrasonic assembly comprises a first guide on a first surface and a second guide on a second surface opposite the first surface, the first guide and the second guide adapted to slide along the housing guide included in the housing.

4. The system of claim 1, comprising a controller adapted to drive at least one of the first ultrasonic transducer or the second ultrasonic transducer at a frequency that is different than a resonant frequency of the respective transducer.

5. The system of claim 1, wherein the housing defines an internal aperture adjacent to the first ultrasonic transducer and the first mounting surface and contacts at least two side surfaces of the first monolithic body other than the first mounting surface and the first coupling surface.

6. A method comprising:

receiving, for a pipe to with which an ultrasonic flow sensor couples, pipe configuration data, the ultrasonic flow sensor configured to monitor water flow in either a first direction or a second direction;

determining, using the pipe configuration data, a distance for a space between a first ultrasonic device and a second ultrasonic device both included in the ultrasonic flow sensor;

emitting, while the first ultrasonic device is the distance away from the second ultrasonic device and water is not flowing through the pipe and using each of two ultrasonic flow transducers included in the ultrasonic flow sensor, one or more first ultrasonic waves;

emitting, while the first ultrasonic device is the distance away from the second ultrasonic device and water is flowing through the pipe and using each of the two ultrasonic flow transducers included in the ultrasonic flow sensor, one or more second ultrasonic waves; and determining, using the one or more first ultrasonic waves and the one or more second ultrasonic waves, one or more sensor calibration settings for the ultrasonic flow sensor that has the distance between the first ultrasonic device and the second ultrasonic device, the determining comprising detecting, from the first direction and the second direction for the water flow, a flow direction calibration using the one or more first ultrasonic waves detected while water is not flowing through the pipe and the one or more second ultrasonic waves detected while water is flowing through the pipe; and causing the ultrasonic flow sensor to have the flow direction calibration using the one or more sensor calibration settings.

7. The method of claim 6, comprising detecting whether there is a leak in a second pipe or a device connected to the pipe using the ultrasonic flow sensor configured with the one or more sensor calibration settings.

8. The method of claim 7, wherein the pipe and the second pipe are the same pipe, pipe branch, or pipe sub-branch.

9. The method of claim 6, wherein the pipe configuration data comprises at least one of a pipe type or a pipe diameter.

10. The method of claim 6, comprising providing, to a device, data that indicates the distance for the space between the first ultrasonic device and the second ultrasonic device both included in the ultrasonic flow sensor.

11. The method of claim 6, comprising adjusting, using data that indicates the distance for the space between the first ultrasonic device and the second ultrasonic device both included in the ultrasonic flow sensor, a position of at least one of the first ultrasonic device or the second ultrasonic device.

12. The method of claim 6, comprising:

determining, using the one or more sensor calibration settings, a likelihood that the ultrasonic flow sensor was installed correctly; and performing one or more actions using the likelihood that the ultrasonic flow sensor was installed correctly.

13. One or more non-transitory computer storage media encoded with instructions that, when executed by one or more computers, cause the one or more computers to perform operations comprising:

accessing, for a pipe to with which an ultrasonic flow sensor couples, pipe configuration data;

determining, using the pipe configuration data, a distance for a space between a first ultrasonic device and a second ultrasonic device both included in the ultrasonic flow sensor;

detecting, using each of two ultrasonic flow transducers included in the ultrasonic flow sensor, one or more first ultrasonic waves emitted while water is not flowing through the pipe and the first ultrasonic device is the distance away from the second ultrasonic device;

detecting, using each of the two ultrasonic flow transducers included in the ultrasonic flow sensor, one or more second ultrasonic waves emitted while water is flowing through the pipe and the first ultrasonic device is the distance away from the second ultrasonic device;

determining, using the one or more first ultrasonic waves detected while water is not flowing through the pipe and the one or more second ultrasonic waves detected while water is flowing through the pipe, one or more sensor calibration settings for the ultrasonic flow sensor that has the distance between the first ultrasonic device and the second ultrasonic device, the determining comprising detecting a flow direction calibration using the one or more first ultrasonic waves detected while water is not flowing through the pipe and the one or more second ultrasonic waves detected while water is flowing through the pipe; and causing configuration of the ultrasonic flow sensor using the one or more sensor calibration settings, the causing comprising causing the ultrasonic flow sensor to have the flow direction calibration using the one or more sensor calibration settings.

14. The media of claim 13, the operations comprising detecting whether there is a leak in a second pipe or a device connected to the pipe using the ultrasonic flow sensor configured with the one or more sensor calibration settings.

15. The media of claim 14, wherein the pipe and the second pipe are the same pipe, pipe branch, or pipe sub-branch.

16. The media of claim 13, wherein the pipe configuration data comprises at least one of a pipe type or a pipe diameter.

17. The media of claim 13, the operations comprising adjusting, using data that indicates the distance for the space between the first ultrasonic device and the second ultrasonic device both included in the ultrasonic flow sensor, a position of at least one of the first ultrasonic device or the second ultrasonic device.

18. The media of claim 13, the operations comprising:

determining to trigger a calibration process given aging of the ultrasonic flow sensor, wherein detecting the one or more first ultrasonic waves emitted while water is not flowing through the pipe and the first ultrasonic device is the distance away from the second ultrasonic device and detecting the one or more second ultrasonic waves emitted while water is flowing through the pipe and the first ultrasonic device is the distance away from the second ultrasonic device are both responsive to determining to trigger a calibration process given aging of the ultrasonic flow sensor.

* * * * *